(12) United States Patent
Poole et al.

(10) Patent No.: US 10,172,281 B2
(45) Date of Patent: Jan. 8, 2019

(54) CUTTING DECK FLOW CONTROL ASSEMBLY

(71) Applicant: HUSQVARNA AB, Huskvarna (SE)

(72) Inventors: James R. Poole, Salisbury, NC (US); David Briney, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 15 days.

(21) Appl. No.: 15/541,560

(22) PCT Filed: Jan. 12, 2015

(86) PCT No.: PCT/US2015/010952
§ 371 (c)(1),
(2) Date: Jul. 5, 2017

(87) PCT Pub. No.: WO2016/114746
PCT Pub. Date: Jul. 21, 2016

(65) Prior Publication Data
US 2018/0020616 A1    Jan. 25, 2018

(51) Int. Cl.
*A01D 34/66* (2006.01)

(52) U.S. Cl.
CPC ................... *A01D 34/667* (2013.01)

(58) Field of Classification Search
CPC .... A01D 34/66; A01D 34/667; A01D 34/668; A01D 34/81

(Continued)

(56) References Cited

U.S. PATENT DOCUMENTS 2,870,616 A    1/1959  Benson
3,469,376 A *  9/1969  Bacon .................. A01D 34/667
                                              56/320.1

(Continued)

FOREIGN PATENT DOCUMENTS

EP    1776858 A1    4/2007
GB     839674 A     6/1960

(Continued)

OTHER PUBLICATIONS

International Search Report and Written Opinion in the International patent application No. PCT/US2015/010952 dated May 6, 2015.

(Continued)

*Primary Examiner* — Thomas B Will
*Assistant Examiner* — Joan D Misa
(74) *Attorney, Agent, or Firm* — McNair Law Firm, P.A.

(57) ABSTRACT

A cutting deck for housing first and second cutting blades rotatable inside a cutting chamber is provided. The cutting deck includes a weldment including a top plate and side plates. The top plate includes first and second shaft reception orifices, and a flow control assembly extending away from the top plate to define an airflow channel between the flow control assembly and the side plates. The flow control assembly includes a first directional changing portion proximate to the first shaft reception orifice and a second directional changing portion proximate to the second shaft reception orifice. The first and second directional changing portions are separated from each other by straight portions. The first and second directional changing portions are passed over only by respective ones of the first and second cutting blades, and both the first and second cutting blades pass over the straight portions.

16 Claims, 4 Drawing Sheets (58) Field of Classification Search
USPC .................................................. 56/320.1
See application file for complete search history.

(56) References Cited

U.S. PATENT DOCUMENTS

| | | | |
|---|---|---|---|
| 3,643,408 A * | 2/1972 | Kulak | A01D 34/63 56/17.4 |
| 3,780,509 A | 12/1973 | Woelffer | |
| 4,107,907 A | 8/1978 | Rutherford | |
| 4,158,279 A | 6/1979 | Jackson | |
| D289,524 S | 4/1987 | Andersson et al. | |
| 5,094,065 A | 3/1992 | Azbell | |
| 5,133,176 A * | 7/1992 | Baumann | A01D 34/005 56/17.4 |
| 5,305,589 A * | 4/1994 | Rodriguez | A01D 34/005 56/17.4 |
| 5,327,710 A | 7/1994 | Plamper et al. | |
| 5,363,635 A | 11/1994 | White, III et al. | |
| D357,691 S | 4/1995 | Bryant | |
| 5,457,947 A * | 10/1995 | Samejima | A01D 34/005 56/16.7 |
| 5,465,564 A * | 11/1995 | Koehn | A01D 34/005 56/13.6 |
| 5,488,821 A * | 2/1996 | McCunn | A01D 34/005 56/320.1 |
| 5,501,068 A | 3/1996 | Martz | |
| 5,615,542 A | 4/1997 | Thorud et al. | |
| 5,732,540 A * | 3/1998 | Samejima | A01D 34/66 56/16.7 |
| 5,791,132 A * | 8/1998 | Wiedenmann | A01D 34/005 56/255 |
| 5,845,475 A * | 12/1998 | Busboom | A01D 34/005 56/320.1 |
| 5,884,466 A * | 3/1999 | Willmering | A01D 34/81 56/320.1 |
| 5,992,135 A | 11/1999 | Benway | |
| 6,038,840 A * | 3/2000 | Ishimori | A01D 34/66 56/13.3 |
| 6,052,979 A | 4/2000 | Tutschka | |
| 6,189,307 B1 * | 2/2001 | Buss | A01D 34/001 56/2 |
| 6,360,517 B1 * | 3/2002 | Ishimori | A01D 34/71 56/255 |
| 6,367,235 B1 | 4/2002 | Moynihan | |
| 6,490,850 B1 | 12/2002 | Seegert et al. | |
| 6,571,544 B1 * | 6/2003 | Buss | A01D 34/66 56/17.4 |
| D482,700 S | 11/2003 | Lancaster | |
| 6,655,119 B2 | 12/2003 | Hasei et al. | |
| D487,098 S | 2/2004 | Arfstrom et al. | |
| 6,688,095 B2 | 2/2004 | Wadzinski | |
| 6,779,328 B2 * | 8/2004 | Buss | A01D 34/66 56/320.1 |
| 6,782,684 B2 * | 8/2004 | Buss | A01D 34/66 56/320.1 |
| 6,892,519 B2 * | 5/2005 | Sugden | A01D 34/005 56/17.4 |
| 6,986,240 B2 | 1/2006 | Kallevig | |
| 6,996,962 B1 * | 2/2006 | Sugden | A01D 34/005 56/17.4 |
| 7,062,898 B2 * | 6/2006 | Sarver | A01D 43/06 56/320.1 |
| 7,065,946 B2 | 6/2006 | Boeck et al. | |
| 7,093,415 B2 * | 8/2006 | Kallevig | A01D 34/005 56/320.2 |
| 7,204,073 B1 * | 4/2007 | Chenevert | A01D 34/005 56/320.2 |
| 7,360,352 B2 * | 4/2008 | Samejima | A01D 34/71 56/320.1 |
| 7,543,435 B2 * | 6/2009 | Imanishi | A01D 34/667 56/320.1 |
| 7,555,887 B2 * | 7/2009 | Schick | A01D 34/71 56/320.1 |
| D598,475 S | 8/2009 | Roth | |
| 7,574,852 B1 * | 8/2009 | Loxterkamp | A01D 34/667 56/320.2 |
| 7,624,562 B2 | 12/2009 | Kallevig et al. | |
| D609,251 S | 2/2010 | Roth | |
| 7,665,286 B2 * | 2/2010 | Butler | A01D 34/005 56/320.1 |
| 7,735,306 B2 * | 6/2010 | Kure | A01D 34/71 56/320.1 |
| D622,740 S | 8/2010 | Roth et al. | |
| 7,823,373 B1 | 11/2010 | Loxterkamp et al. | |
| 7,866,135 B2 * | 1/2011 | Davis | A01D 34/71 56/320.2 |
| 7,987,657 B2 * | 8/2011 | Yoshihara | A01D 34/828 56/1 |
| D649,981 S | 12/2011 | Roth et al. | |
| 8,091,332 B2 * | 1/2012 | Hulsman | A01D 34/81 56/320.1 |
| 8,171,709 B1 * | 5/2012 | Bedford | A01D 34/005 56/320.2 |
| 8,215,091 B2 * | 7/2012 | Fox | A01D 34/76 56/17.5 |
| 8,539,745 B2 * | 9/2013 | Schmidt | A01D 43/0636 56/320.2 |
| D693,373 S | 11/2013 | Shiotsuki et al. | |
| D694,781 S | 12/2013 | Roth | |
| D694,782 S | 12/2013 | Roth | |
| D710,396 S | 8/2014 | Nie | |
| D723,589 S | 3/2015 | Nishihara et al. | |
| 9,113,595 B2 | 10/2015 | Roth et al. | |
| D759,126 S | 6/2016 | Johnson et al. | |
| D766,332 S | 9/2016 | Poole et al. | |
| D767,639 S | 9/2016 | Johnson et al. | |
| D781,351 S | 3/2017 | Upham | |
| D781,927 S | 3/2017 | Craven et al. | |
| 2005/0172601 A1 | 8/2005 | Besogne | |
| 2005/0229573 A1 | 10/2005 | Curran | |
| 2006/0048492 A1 | 3/2006 | Harris | |
| 2007/0084175 A1 * | 4/2007 | Buss | A01D 43/077 56/320.1 |
| 2010/0101201 A1 | 4/2010 | Yanke | |
| 2011/0173940 A1 | 7/2011 | Priepke | |
| 2013/0128043 A1 | 5/2013 | Avnery | |
| 2014/0075913 A1 * | 3/2014 | Walker | A01D 34/81 56/255 |
| 2014/0196428 A1 | 7/2014 | Shiotsuki et al. | |
| 2015/0082763 A1 | 3/2015 | Nishihara et al. | |
| 2016/0037716 A1 | 2/2016 | Johansson et al. | |

FOREIGN PATENT DOCUMENTS

| | | |
|---|---|---|
| GB | 2525499 A | 10/2015 |
| JP | 4791932 B2 | 10/2011 |
| WO | 2010140904 A1 | 12/2010 |
| WO | 2014152644 A1 | 9/2014 |
| WO | 2014152992 A2 | 9/2014 |
| WO | 2015016895 A1 | 2/2015 |

OTHER PUBLICATIONS

International Preliminary Report on Patentability for International Application No. PCT/US2015/010952 dated Jul. 18, 2017.
Toro, 'Toro Blade Adapter', accessed at http://www.hy-capacity.com/index_php?page=Search&partid=55834, accesses on Mar. 25, 2016, p. 2.

* cited by examiner

CUTTING DECK FLOW CONTROL ASSEMBLY

TECHNICAL FIELD

Example embodiments generally relate to outdoor power equipment and, more particularly, some embodiments relate to a flow control assembly for use inside a cutting deck of a lawn mower.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, lawn mowers of either type employ rotary cutting blades that must be housed for safety reasons. However, the housing of the mower blades within a cutting deck can also enhance the general mowing experience when it is designed to implement other useful functions like directing grass out of a discharge chute or into a bagging attachment. To facilitate airflow control within the housing, a number of strategies may be employed.

Cutting decks may generally be provided via stamped or fabricated construction. A stamped cutting deck is typically lighter and is formed using large molds and presses with thin gauge steel. Meanwhile, fabricated cutting decks are built from heavier plate steel and are formed via welding of various pieces together. Although fabricated cutting decks may have a reputation for being sturdier (by virtue of the heavier plate steel employed), fabricated cutting decks also have a reputation for providing poorer airflow than stamped cutting decks. Given the lighter construction of the stamped cutting deck, the stamped cutting deck is generally considered to be more flexible. Manufacturers are therefore believed to have more control over the design processes of stamped cutting decks to enable the manufacturers to better streamline airflow within stamped cutting decks. In light of the strong reputation that fabricated cutting decks already have for sturdiness, it may be desirable to improve the flow characteristics of such cutting decks to provide a cutting deck that is both sturdy and also has streamlined airflow characteristics.

BRIEF SUMMARY OF SOME EXAMPLES

Some example embodiments may provide a cutting deck having a fabricated construction, which further employs a "racetrack" baffle to provide improved airflow for a multi-blade, fabricated cutting deck.

In an example embodiment, outdoor power equipment is provided. The equipment may include a frame, an engine operably coupled to the frame, and a cutting deck operably coupled to the frame. The cutting deck houses at least a first cutting blade and a second cutting blade. The first and second cutting blades are rotatable responsive to operation of the engine. The cutting deck includes a weldment including a top plate and one or more side plates defining a cutting chamber in which the first and second cutting blades are rotatable responsive to operation of the engine, and a flow control assembly disposed within the cutting chamber and extending away from the top plate to define an airflow channel between the flow control assembly and the one or more side plates. The flow control assembly includes a first directional changing portion disposed proximate to the first cutting blade and a second directional changing portion disposed proximate to the second cutting blade. The first and second directional changing portions are separated from each other by substantially straight portions of the flow control assembly. The first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades.

In another example embodiment, a cutting deck for outdoor power equipment having at least a first cutting blade and a second cutting blade rotatable inside a cutting chamber is provided. The cutting deck includes a weldment including a top plate and one or more side plates defining the cutting chamber. The top plate includes at least a first shaft reception orifice through which a shaft of the first cutting blade is extendable and a second shaft reception orifice through which a shaft of the second cutting blade is extendable, and a flow control assembly disposed within the cutting chamber and extending away from the top plate to define an airflow channel between the flow control assembly and the one or more side plates. The flow control assembly includes a first directional changing portion disposed proximate to the first shaft reception orifice and a second directional changing portion disposed proximate to the second shaft reception orifice. The first and second directional changing portions are separated from each other by substantially straight portions of the flow control assembly. The first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

As indicated above, a fabricated cutting deck is often thought to be less capable (due to the more rigid steel construction) of being designed to foster streamlined airflow. However, some example embodiments may provide an airflow control assembly that can be employed even within a fabricated cutting deck to improve airflow characteristics. In this regard, for example, some embodiments may provide the cutting deck further with a baffle (e.g., shroud) having a "racetrack" shape to extend around the downshafts of multiple cutting blades. The baffle may create a flow channel that enhances airflow within the cutting deck.

Figure 1:
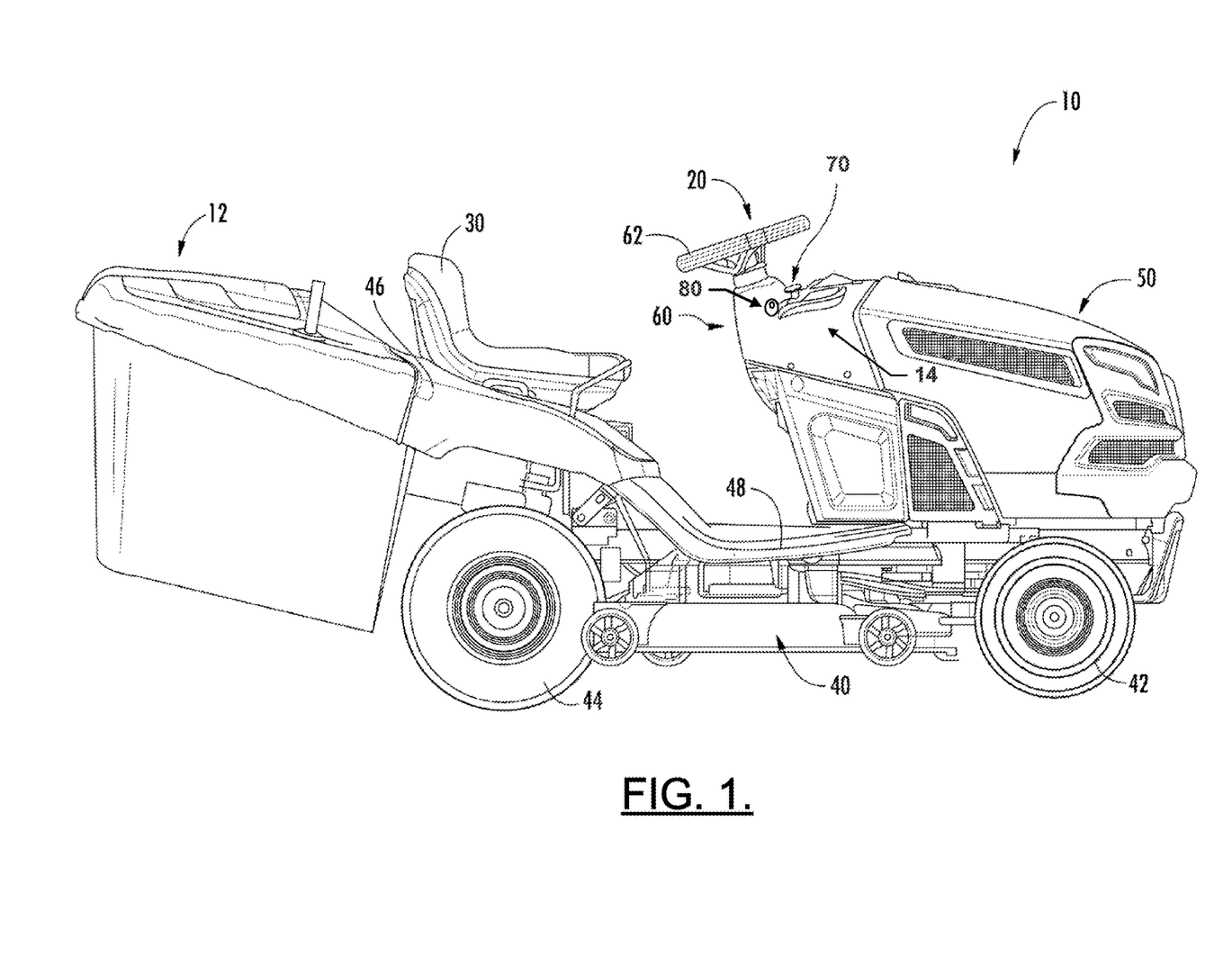
FIG. 1 illustrates a perspective view of the riding lawn care vehicle according to an example embodiment.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may also include an operations panel 14 that may display operational information regarding the riding lawn care vehicle 10 and host various controls, gauges, switches, displays, and/or the like. As shown and described herein, the riding lawn care vehicle 10 may be a riding lawn mower (e.g., a lawn tractor, front-mount riding lawn mower, riding lawn mower with a zero or near zero degree radius of turn, cross mower, stand-on riding lawn mower, and/or the like). However, other example embodiments may be employed on other multi-blade lawn mowers, such as walk behind lawn mowers with wide decks, stand on mowers, mowers with zero (or near zero) turning radius, and/or the like.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having more than one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases, the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have two, three, or more cutting blades driven by two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck. In any case, the shafts may extend downward through a top portion of the cutting deck 40 in a manner described in greater detail below.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control-related components such as one or more speed controllers, brakes, cutting height adjusters, and/or the like. Some of the controllers, such as the speed controllers and/or brakes, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blades disposed within the cutting deck 40. In this regard, for example, the engine 50 may be used to turn a shaft upon which each of the cutting blades may be fixed (e.g., via a belt and pulley system and/or other mechanisms). The turning of the shaft(s), at high speeds, may move the cutting blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blades and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14.

The operations panel 14, or some other portion of the steering assembly housing 60, may also provide support for an ignition interface 80 of an example embodiment. The ignition interface 80 may be used for starting the engine 50 and for controlling other functions of the riding lawn care vehicle 10. In an example embodiment, the ignition interface 80 may not require a key to operate. Thus, the operator of the riding lawn care vehicle 10 may be enabled to start and/or initiate one or more functional capabilities of the riding lawn care vehicle 10 without the use of a physical key.

The cutting deck 40 of an example embodiment may be a fabricated cutting deck. As such, the cutting deck 40 may be formed from relatively large gauge, or thicker steel, than a typical stamped cutting deck. The cutting deck 40 may also therefore be a weldment that is constructed of a plurality of portions that are welded together to form the cutting deck 40. Some examples of structures that may be employed to form the cutting deck 40 are described in greater detail below in reference to FIGS. 2-4.

Figure 2A:
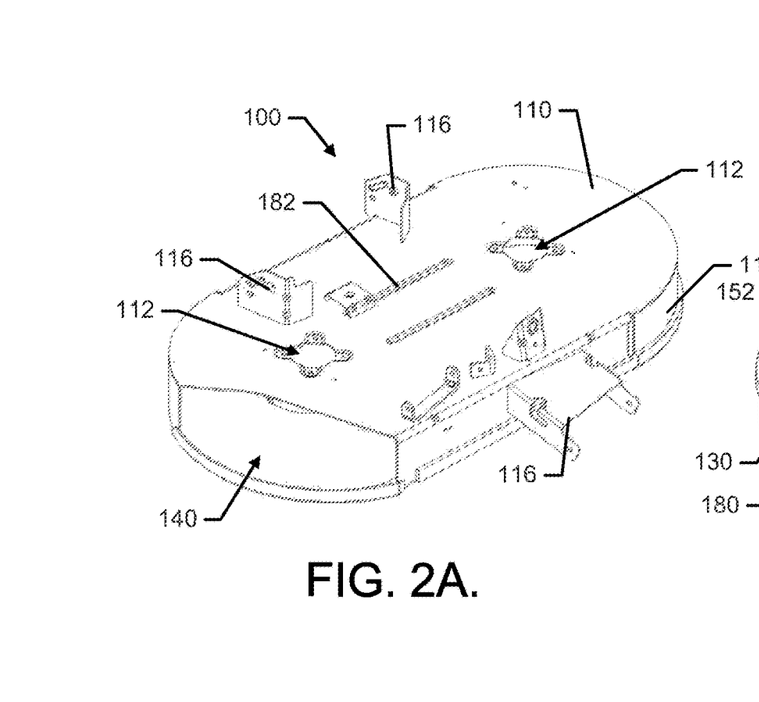
FIG. 2A illustrates a top perspective view of a weldment for a cutting deck of a riding lawn care vehicle in accordance with an example embodiment.
Figure 2B:
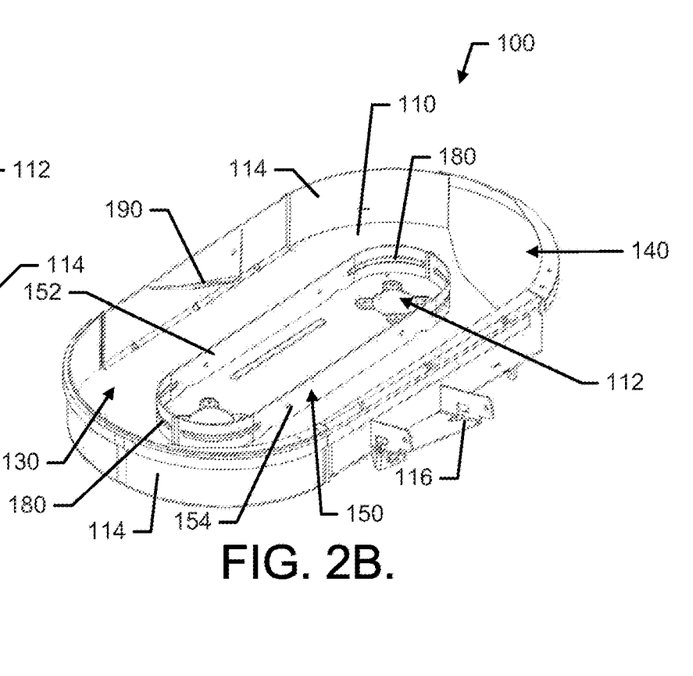
FIG. 2B illustrates a bottom perspective view of the weldment in accordance with an example embodiment.
Figure 3:
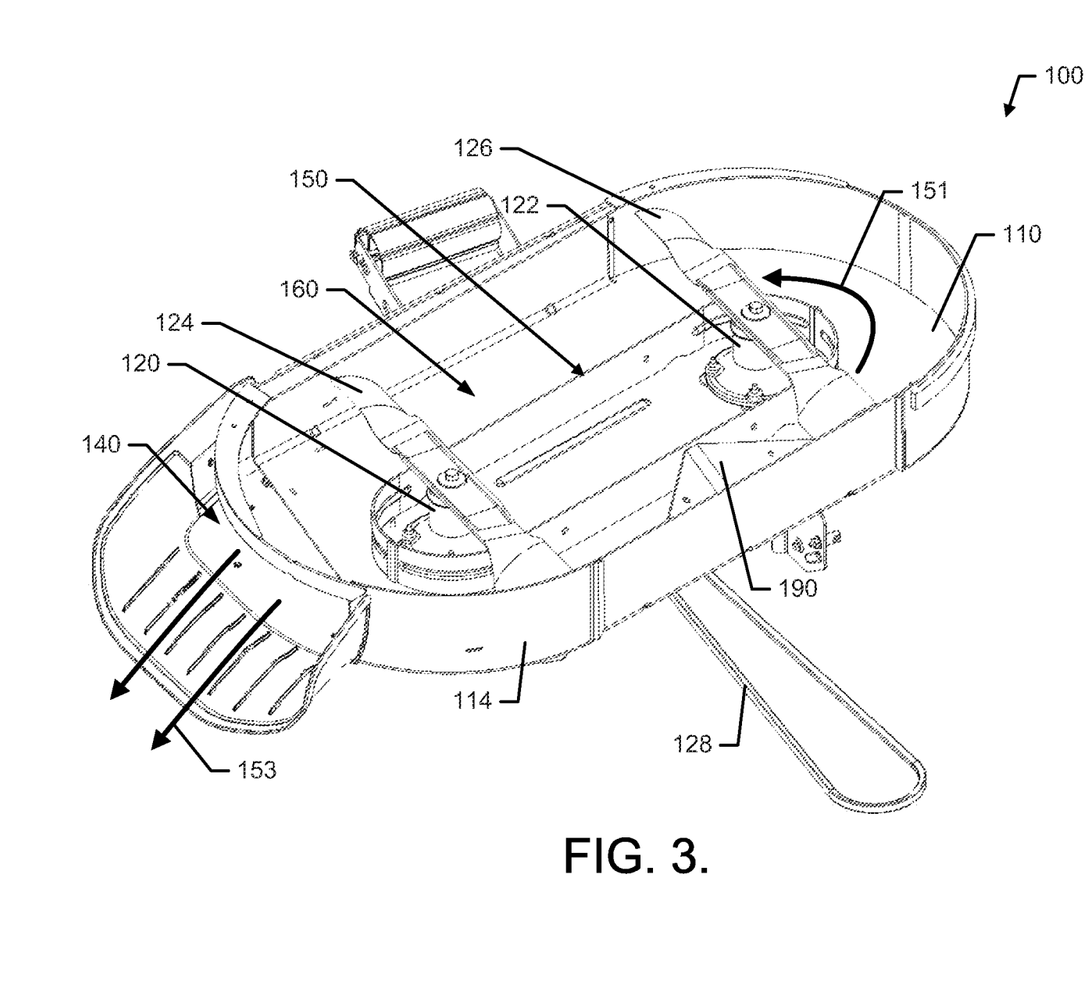
FIG. 3 illustrates a bottom perspective view of the cutting deck with other components attached in accordance with an example embodiment.

FIG. 2, which includes FIGS. 2A and 2B, illustrates a perspective view of one example of a cutting deck weldment 100 that may form the cutting deck 40 of some examples. FIG. 2A illustrates a top perspective view of the weldment 100 and FIG. 2B illustrates a bottom perspective view of the weldment 100. FIG. 3 illustrates a bottom perspective view of the weldment 100 with various other components operably coupled thereto also shown in their corresponding locations according to one example embodiment.

The weldment 100 may include a top plate 110 having a plurality of shaft reception orifices 112 formed therein. The number of shaft reception orifices 112 may be equal to the number of blades (and corresponding shafts) employed in the cutting deck 40. In this example, a first shaft 120 and a second shaft 122 are provided with a corresponding first blade 124 and second blade 126, respectively, attached thereto. The first and second shafts 120 and 122 may be extended through the shaft reception orifices 112 to provide operable coupling between the first and second blades 124 and 126 and the engine 50 of the riding lawn care vehicle 10 via, for example, a belt 128 or other coupling device.

The top plate 110 may be welded to one or more side plates 114 that may extend substantially perpendicularly from peripheral edges of the top plate 110 to define a cutting chamber 130. The top plate 110 and/or side plates 114 may also have brackets 116 formed on external surfaces thereof to enable the weldment 100 to be operably coupled to the riding lawn care vehicle 10. A gap may be formed at a portion of the top plate 110 and/or side plates 114 to define a discharge opening 140 that may be disposed to direct ejected grass to one side or the other of the riding lawn care vehicle 10. As the first and second blades 124 and 126 turn to cut grass in the cutting chamber 130, a rotating air current may be generated in the cutting chamber 130 to stand grass up prior to cutting. Each blade tends to create its own rotating current extending circularly around itself. In a single blade system, this rotating air current also takes the cut grass efficiently toward the discharge opening 140, which is a side discharge in this example embodiment. However, for a multiple blade system, a high pressure area can be created between the blades, and pressure buildup between the blades can lead to incoherent airflow in this region. The creation of streamlined airflow in the cutting chamber 130 can enhance the efficiency of ejection and inhibit buildup of grass and/or debris sticking to inside walls of the cutting chamber 130.

As indicated above, the discharge opening 140 is a side discharge for a multi-blade cutting deck. If the discharge opening 140 were instead located centrally within the cutting deck 40 (e.g., in a rear discharge configuration), the racetrack configuration may be less helpful. In this regard, for example, the blades could each push the grass to the centrally located discharge so that the total distance traveled by the grass is less. However, for a longer distance traveled by clippings cut further from the discharge opening 140, the creation of a coherent flow to move grass effectively over the longer distance to the discharge opening becomes an even more desirable feature. Thus, a structure may be provided to improve the airflow in the cutting chamber 130.

In an example embodiment, an airflow control assembly 150 may also be provided within the cutting chamber 130 to improve streamlining of the airflow. The airflow control assembly 150 may be provided to extend downwardly from the top plate 110 proximate to the shaft reception orifices 112 and therefore also proximate to the first and second shafts 120 and 122. As can be appreciated from FIGS. 2 and 3, the airflow control assembly 150 may tend to inhibit airflow from passing immediately around each of the blades and may actually form a channel to facilitate coherent passage of airflow around the airflow control assembly 150 on the way to the discharge opening 140. Arrows 151 and 153 show the airflow moving in a counterclockwise direction (for the perspective shown) toward and out of the discharge opening 140. This may facilitate forcing pressure out of the middle region between the blades to create coherent airflow in a consistent direction within the cutting deck 40.

In some cases, the airflow control assembly 150 may be formed from a first sidewall portion 152 and a second sidewall portion 154 that each form opposing halves of the airflow control assembly 150 and which are welded to each other at longitudinal ends thereof. The first and second sidewall portions 152 and 154 may also be welded to the top plate 110. In an example embodiment, the first and second sidewall portions 152 and 154 may each extend substantially perpendicularly away from the top plate 110 into the cutting chamber 130 to form an airflow channel 160 between the first and second sidewall portions 152 and 154 and the side plates 114 of the weldment 100. As such, in some cases, the first and second sidewall portions 152 and 154 may be substantially parallel to the corresponding portions of the side plates 114 that are closest thereto, and may also be concentric with the side plates 114. The first and second sidewall portions 152 and 154 may therefore form an elongated annular structure that substantially matches the shape of the side plates 114, but on a smaller scale. The shape of the airflow channel 160 is therefore a "racetrack" shape that can provide for streamlined airflow therein.

The first and second sidewall portions 152 and 154 may be elongated, relatively thin metallic strips (e.g., ⅛ inch steel) that are substantially straight except that each is bent proximate to both respective ends thereof. The bends at end portions of each of the first and second sidewall portions 152 and 154 may be formed in the same direction. However, the bends at ends of the first sidewall portion 152 may be formed in a direction opposite the direction in which ends of the second sidewall portion 154 are formed. Accordingly, when welded to the top plate 110, the end portions of the first and second sidewall portions 152 and 154 may bend toward each other and be welded or otherwise affixed to each other to form the airflow control assembly 150 into a continuous structure. The straight portions of each of the first and second sidewall portions 152 and 154 may be parallel to each other.

It should be appreciated that in some cases, the airflow control assembly 150 could alternatively be formed from a single elongated metallic structure that is bent at its ends and at its middle in order to form two straight portions and two bent portions (the ends of the single metallic structure meeting each other at one of the bent portions or one of the straight portions to define the continuous structure). Thus, for example, the first and second sidewall portions 152 and 154 could be parts of the same unitary piece of metal. Alternatively, the airflow control assembly 150 could be formed from a number of smaller structures joined together such that the first and second sidewall portions 152 could each be assembled from smaller parts. However, in any case, the airflow control assembly 150 may include substantially straight portions extending between bent portions that are disposed proximate to blade reception orifices. The bent portions may be provided to make substantial directional changes for extension of sidewalls of the airflow control assembly 150, and the straight portions (which could actually have some slight curvature to them, but generally maintain a consistent direction extending between bent portions) may extend between the bent portions. Moreover, each straight portion may have at least a portion thereof that is proximate to at least two rotating blades, while each bent portion may only be proximate to one (i.e., the closest) rotating blade.

In the context of the example of FIGS. 2 and 3, the first and second blades 124 and 126 both pass over (from the perspective of a viewer looking into the cutting chamber 130 from below) both of the straight portions of both of the first and second sidewalls 152 and 154. However, the first blade 124 only passes over the bent portion closest to the first blade 124 and does not pass over the bent portion closest to the second blade 126. Meanwhile, the second blade 126 only passes over the bent portion closest to the second blade 126 and does not pass over the bent portion closest to the first blade 124. It should be appreciated that the term "pass over" describes the relative situation expressed in FIGS. 2 and 3 based on the views provided, but the blades literally pass "under" the first and second sidewalls 152 and 154. Thus, the term "pass over" should be appreciated as being equally applicable to passing under or otherwise proximate to the first and second sidewall portions 152 and 154 in other situations where different perspectives apply as well.

Although not required, the bent portions may further include stiffening ribs 180 provided to extend along a longitudinal direction of the ends of the first and second sidewall portions 152 and 154. Such stiffening ribs 180 may not be provided in the straight portions. Thus, the first blade 124 only passes over the stiffening ribs 180 closest to the first blade 124 and does not pass over the stiffening ribs 180 closest to the second blade 126. Meanwhile, the second blade 126 only passes over the stiffening ribs 180 closest to the second blade 126 and does not pass over the stiffening ribs 180 closest to the first blade 124. In some cases, the top plate 110 may also include stiffening ribs 182 provided therein to prevent sagging or other bending of the top plate 110. However, the first and second sidewall portions 152 and 154 may also serve to support interior portions of the top plate 110 to reinforce and strengthen the top plate 110 to prevent sagging or bending thereof.

A height of the first and second sidewalls 152 and 154 may be measured in a direction extending away from the top plate 110. Likewise, a height of the side plates 114 may also be measured in the direction extending away from the top plate 110. Generally speaking, the height of the first and second sidewalls 152 and 154 may be less than the height of the side plates 114 by an amount slightly greater than a maximum depth of the blades measured between the farthest ends of the blade in a direction parallel to the axis of rotation of the blades (e.g., a blade profile depth).

In some embodiments, the weldment 100 may be further provided with a nose baffle 190. The nose baffle 190, although not required, may be provided at both or only a single portion of the region between the blades extending inwardly from the side plates 114 toward the airflow control assembly 150. In the example of FIGS. 2 and 3, the nose baffle 190 may extend from a rearward and bottom portion of the side plates 114 (the bottom portion of the side plates 114 appears on top in the upside down views of FIGS. 2B and 3). The nose baffle 190 also has a substantially triangular or pyramidal shape as it extends into the region between the blades to provide a lower bound to the airflow channel 160 in this region. The nose baffle 190 may prevent pressure buildup in this region and further facilitate coherent airflow in the airflow channel 160.

Figure 4A:
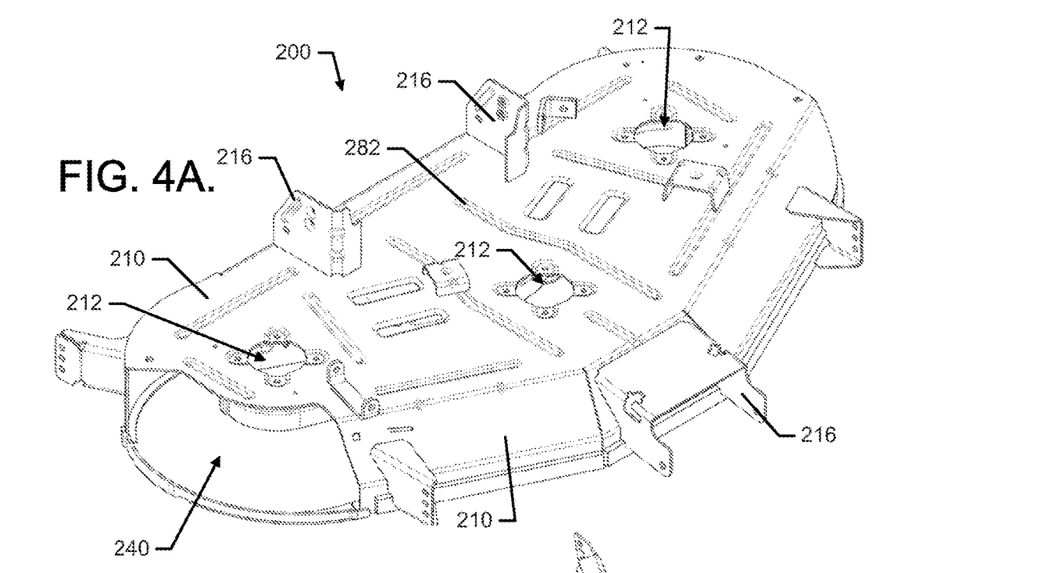
FIG. 4A illustrates a top perspective view of a weldment for a cutting deck having three blades in accordance with an example embodiment.
Figure 4B:
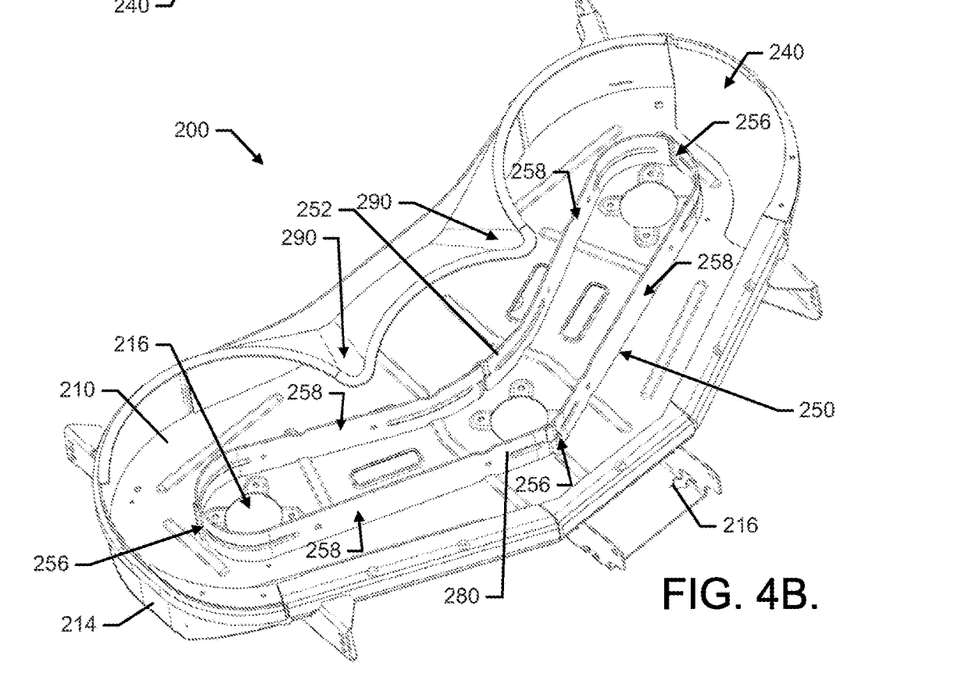
FIG. 4B illustrates a bottom perspective view of the weldment in accordance with an example embodiment.

FIG. 4, which includes FIGS. 4A and 4B, shows perspective views from the top (FIG. 4A) and bottom (FIG. 4B) of a weldment 200 that may be employed for an example structure with more than two blades in accordance with an example embodiment. The weldment 200 may include a top plate 210 having a plurality of shaft reception orifices 212 formed therein. In this example, since three blades would be employed, there are a corresponding three shaft reception orifices 212.

The top plate 210 may be welded to one or more side plates 214 that may extend substantially perpendicularly from peripheral edges of the top plate 210 to define a cutting chamber 230. However, note that this example includes two nose baffles 290 that, instead of being added to the interior of the cutting chamber 230 by extending inwardly from the side plates 214, are integrally formed in the side plates 214 at a rear portion of the cutting deck 40. The top plate 210 and/or side plates 214 may also have brackets 216 formed on external surfaces thereof to enable the weldment 200 to be operably coupled to the riding lawn care vehicle 10. A gap may be formed at a portion of the top plate 210 and/or side plates 214 to define a discharge opening 240. As the blades (not shown) turn to cut grass in the cutting chamber 230, a rotating air current may be generated in the cutting chamber 230 to stand grass up prior to cutting. As mentioned above, an airflow control assembly 250 may be provided within the cutting chamber 230 to improve streamlining of the airflow.

The airflow control assembly 250, again in similar fashion to the prior example, may be provided to extend downwardly from the top plate 210 proximate to the shaft reception orifices 212 to enclose each of the shaft reception orifices 212 in a region outlined by the airflow control assembly 250. As can be appreciated from FIG. 4, the airflow control assembly 250 may tend to inhibit airflow from passing immediately around each of the blades and may actually form a channel (e.g., airflow channel 260) to facilitate coherent passage of airflow around the outside of the airflow control assembly 250 on the way to the discharge opening 240. This may facilitate forcing pressure out of the middle regions formed between each of the blades to create coherent airflow in a consistent direction within the cutting deck 40.

The airflow control assembly 250 may be formed of one or more sidewall portions 252, similar to the description provided above for the example of FIGS. 2 and 3. Similar to that example, the sidewall portions 252 could be provided in any of a number of different ways (e.g., as one or a plurality of pieces). The sidewall portions 252 may be welded to the top plate 210 and extend substantially perpendicularly away from the top plate 210 into the cutting chamber 230 to form the airflow channel 260 between the sidewall portions 252 and the side plates 214 of the weldment 200. As such, in this example also, the shape of the airflow channel 260 is generally that of a "racetrack" shape that can provide for streamlined airflow therein.

The sidewall portions 252 in this example may also be elongated, relatively thin metallic strips that are substantially straight except that each is bent proximate to any necessary changes in direction that occur due to the placement of corresponding shaft reception orifices 212. Accordingly, in more general terms, the airflow control assembly 250 of an example embodiment may be considered to be formed from an equal number of directional changing portions 256 to the number of blades employed (and the number of shaft reception orifices 212), and a set of two opposing substantially straight portions 258 extending in between opposing ends of each of the directional changing portions 256 as shown in FIG. 4. Furthermore, for these multiple-blade embodiments, each directional changing portion 256 is passed over by, proximate to, and/or in the blade shadow zone of only a single (i.e., the closest) rotating blade. However, each of the two substantially straight portions 258 extending away from the directional changing portions 256 is passed over by, proximate to, and/or in the blade shadow zone of two rotating blades. This ensures that a "racetrack" shape and corresponding streamlined airflow through the resulting airflow channel (e.g., airflow channel 260) can be achieved for any number of blades provided in the cutting deck 40.

As discussed above, the directional changing portions 256 (or bent portions) may further include stiffening ribs 280 provided to extend along a longitudinal direction of the sidewall portions 252. In some cases, the top plate 210 may also include stiffening ribs 282 provided therein to prevent sagging or other bending of the top plate 210. However, the sidewall portions 252 may also serve to support interior portions of the top plate 210 to reinforce and strengthen the top plate 210 to prevent sagging or bending thereof.

Accordingly, a cutting deck and corresponding outdoor power equipment having such a cutting deck are provided in accordance with an example embodiment. The outdoor power equipment may include at least a first cutting blade and a second cutting blade rotatable inside a cutting chamber is provided. The cutting deck includes a weldment including a top plate and one or more side plates defining the cutting chamber. The top plate includes at least a first shaft reception orifice through which a shaft of the first cutting blade is extendable and a second shaft reception orifice through which a shaft of the second cutting blade is extendable, and a flow control assembly disposed within the cutting chamber and extending away from the top plate to define an airflow channel between the flow control assembly and the one or more side plates. The flow control assembly includes a first directional changing portion disposed proximate to the first shaft reception orifice and a second directional changing portion disposed proximate to the second shaft reception orifice. The first and second directional changing portions are separated from each other by substantially straight portions of the flow control assembly. The first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades.

In an example embodiment, various optional additions, modifications and/or augmentations may be provided for the cutting deck described above. In this regard, for example, (1) the flow control assembly may include a first sidewall portion and a second sidewall portion each of which extend substantially perpendicularly away from the top plate. In an example embodiment, (2) the first and second sidewall portions may extend across an interior portion of the top plate to inhibit bending or sagging of the top plate. In such an example, (3) the first and second sidewall portions may each terminate at their respective ends at corresponding bent portions and the bent portions of the first and second sidewall portions may meet to form the first and second directional portions. Additionally or alternatively, (4) the first and second sidewall portions may include stiffening ribs disposed in a surface thereof. In some embodiments, (5) the cutting deck may further include a nose baffle extending into the airflow channel from a portion of the one or more side plates substantially equidistant from the first shaft reception orifice and the second shaft reception orifice. In an example embodiment, (6) the cutting deck may house one or more additional cutting blades, and the flow control assembly may include an equal number of directional changing portions to a total number of cutting blades. In such an example, (7) the cutting deck may include a plurality of nose baffles extending into the airflow channel from respective portions of the one or more side plates that are each substantially equidistant between a respective pair of shaft reception orifices.

In some cases, some or all of the examples described above may be further augmented or modified in any desirable combination. For example, any or all of (1) to (7) may be employed and the flow control assembly may form a continuous enclosure concentrically disposed within the cutting chamber relative to the one or more side plates. Alternatively or additionally, any or all of (1) to (7) may be employed and the one or more side plates may extend away from the top plate by a first distance and the flow control assembly extends away from the top plate by a second distance. In such an example, the second distance may be less than the first distance by at least a blade profile depth amount. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. Outdoor power equipment comprising:
    a frame;
    an engine operably coupled to the frame; and
    a cutting deck operably coupled to the frame, the cutting deck housing at least a first cutting blade and a second cutting blade, the first and second cutting blades being rotatable responsive to operation of the engine,
    wherein the cutting deck comprises a weldment comprising:
        a top plate and one or more side plates defining a cutting chamber in which the first and second cutting blades are rotatable responsive to operation of the engine; and
        a flow control assembly disposed within the cutting chamber and extending away from the top plate to define an airflow channel between the flow control assembly and the one or more side plates,
    wherein the flow control assembly comprises a first directional changing portion disposed proximate to the first cutting blade and a second directional changing portion disposed proximate to the second cutting blade, the first and second directional changing portions being separated from each other by substantially straight portions of the flow control assembly,
    wherein the first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades,
    wherein the flow control assembly comprises a first sidewall portion and a second sidewall portion each of which extend substantially perpendicularly away from the top plate, and
    wherein the first and second sidewall portions extend across an interior portion of the top plate to inhibit bending or sagging of the top plate.

2. The outdoor power equipment of claim 1, wherein the first and second sidewall portions each terminate at their respective ends at corresponding bent portions, the bent portions of the first and second sidewall portions meeting to form the first and second directional portions.

3. The outdoor power equipment of claim 1, wherein the first and second sidewall portions include stiffening ribs disposed in a surface thereof.

4. The outdoor power equipment of claim 1, wherein the flow control assembly forms a continuous enclosure concentrically disposed within the cutting chamber relative to the one or more side plates.

5. The outdoor power equipment of claim 1, wherein the one or more side plates extend away from the top plate by a first distance and the flow control assembly extends away from the top plate by a second distance, and wherein the second distance is less than the first distance by at least a blade profile depth amount.

6. The outdoor power equipment of claim 1, wherein the outdoor power equipment comprises a riding lawn care device.

7. The outdoor power equipment of claim 1, wherein the outdoor power equipment comprises a walk-behind lawn care device.

8. The outdoor power equipment of claim 1, wherein the cutting deck comprises a side discharge opening provided in the one or more side plates.

9. Outdoor power equipment comprising:
    a frame;
    an engine operably coupled to the frame; and
    a cutting deck operably coupled to the frame, the cutting deck housing at least a first cutting blade and a second cutting blade, the first and second cutting blades being rotatable responsive to operation of the engine,
    wherein the cutting deck comprises a weldment comprising:
        a top plate and one or more side plates defining a cutting chamber in which the first and second cutting blades are rotatable responsive to operation of the engine; and
        a flow control assembly disposed within the cutting chamber and extending away from the top plate to define an airflow channel between the flow control assembly and the one or more side plates,
    wherein the flow control assembly comprises a first directional changing portion disposed proximate to the first cutting blade and a second directional changing portion disposed proximate to the second cutting blade, the first and second directional changing portions being separated from each other by substantially straight portions of the flow control assembly,
    wherein the first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades, and wherein the cutting deck further comprises a nose baffle extending into the airflow channel away from a portion of the one or more side plates.

10. Outdoor power equipment comprising:
a frame;
an engine operably coupled to the frame; and
a cutting deck operably coupled to the frame, the cutting deck housing at least a first cutting blade and a second cutting blade, the first and second cutting blades being rotatable responsive to operation of the engine,
wherein the cutting deck comprises a weldment comprising:
 a top plate and one or more side plates defining a cutting chamber in which the first and second cutting blades are rotatable responsive to operation of the engine; and
 a flow control assembly disposed within the cutting chamber and extending away from the top plate to define an airflow channel between the flow control assembly and the one or more side plates,
wherein the flow control assembly comprises a first directional changing portion disposed proximate to the first cutting blade and a second directional changing portion disposed proximate to the second cutting blade, the first and second directional changing portions being separated from each other by substantially straight portions of the flow control assembly,
wherein the first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades, and
wherein the cutting deck houses one or more additional cutting blades, and wherein the flow control assembly comprises an equal number of directional changing portions to a total number of cutting blades.

11. The outdoor power equipment of claim 10, further comprising a plurality of nose baffles extending into the airflow channel from respective portions of the one or more side plates that are each substantially equidistant between a respective pair of cutting blades.

12. A cutting deck for outdoor power equipment, the outdoor power equipment comprising at least a first cutting blade and a second cutting blade rotatable inside a cutting chamber, the cutting deck comprising a weldment comprising:
 a top plate and one or more side plates defining the cutting chamber, the top plate comprising at least a first shaft reception orifice through which a shaft of the first cutting blade is extendable and a second shaft reception orifice through which a shaft of the second cutting blade is extendable; and
 a flow control assembly disposed within the cutting chamber and extending away from the top plate to define an airflow channel between the flow control assembly and the one or more side plates,
wherein the flow control assembly comprises a first directional changing portion disposed proximate to the first shaft reception orifice and a second directional changing portion disposed proximate to the second shaft reception orifice, the first and second directional changing portions being separated from each other by substantially straight portions of the flow control assembly,
wherein the first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades,
wherein the flow control assembly comprises a first sidewall portion and a second sidewall portion each of which extend substantially perpendicularly away from the top plate,
wherein the first and second sidewall portions extend across an interior portion of the top plate to inhibit bending or sagging of the top plate,
wherein the first and second sidewall portions each terminate at their respective ends at corresponding bent portions, the bent portions of the first and second sidewall portions meeting to form the first and second directional portions, or
wherein the first and second sidewall portions include stiffening ribs disposed in a surface thereof.

13. The cutting deck of claim 12, wherein the flow control assembly forms a continuous enclosure concentrically disposed within the cutting chamber relative to the one or more side plates.

14. A cutting deck for outdoor power equipment, the outdoor power equipment comprising at least a first cutting blade and a second cutting blade rotatable inside a cutting chamber, the cutting deck comprising a weldment comprising:
 a top plate and one or more side plates defining the cutting chamber, the top plate comprising at least a first shaft reception orifice through which a shaft of the first cutting blade is extendable and a second shaft reception orifice through which a shaft of the second cutting blade is extendable; and
 a flow control assembly disposed within the cutting chamber and extending away from the top plate to define an airflow channel between the flow control assembly and the one or more side plates,
wherein the flow control assembly comprises a first directional changing portion disposed proximate to the first shaft reception orifice and a second directional changing portion disposed proximate to the second shaft reception orifice, the first and second directional changing portions being separated from each other by substantially straight portions of the flow control assembly,
wherein the first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades, and
wherein the cutting deck further comprises a nose baffle extending into the airflow channel away from a portion of the one or more side plates.

15. A cutting deck for outdoor power equipment, the outdoor power equipment comprising at least a first cutting blade and a second cutting blade rotatable inside a cutting chamber, the cutting deck comprising a weldment comprising:
- a top plate and one or more side plates defining the cutting chamber, the top plate comprising at least a first shaft reception orifice through which a shaft of the first cutting blade is extendable and a second shaft reception orifice through which a shaft of the second cutting blade is extendable; and
- a flow control assembly disposed within the cutting chamber and extending away from the top plate to define an airflow channel between the flow control assembly and the one or more side plates,
- wherein the flow control assembly comprises a first directional changing portion disposed proximate to the first shaft reception orifice and a second directional changing portion disposed proximate to the second shaft reception orifice, the first and second directional changing portions being separated from each other by substantially straight portions of the flow control assembly,
- wherein the first directional changing portion is passed over only by the first cutting blade and the second directional changing portion is passed over by only the second cutting blade, and both the first and second cutting blades pass over the substantially straight portions between the first and second directional changing portions responsive to rotation of the first and second cutting blades, and
- wherein the cutting deck houses one or more additional cutting blades, and wherein the flow control assembly comprises an equal number of directional changing portions to a total number of cutting blades.

16. The cutting deck of claim 15, further comprising a plurality of nose baffles extending into the airflow channel from respective portions of the one or more side plates that are each substantially equidistant between a respective pair of shaft reception orifices.

* * * * *